(12) United States Patent
Frydrych

(10) Patent No.: US 11,797,253 B1
(45) Date of Patent: Oct. 24, 2023

(54) DIGITAL PICTURE FRAME ASSEMBLY

(71) Applicant: Russell Frydrych, Libertyville, IL (US)

(72) Inventor: Russell Frydrych, Libertyville, IL (US)

( * ) Notice: Subject to any disclaimer, the term of this patent is extended or adjusted under 35 U.S.C. 154(b) by 0 days.

(21) Appl. No.: 17/966,178

(22) Filed: Oct. 14, 2022

(51) Int. Cl.
*G06F 3/14* (2006.01)

(52) U.S. Cl.
CPC ................... *G06F 3/1423* (2013.01)

(58) Field of Classification Search
CPC .... G04G 9/0076; G04G 13/02; G04G 9/0064; G04G 9/102; G04G 9/107; G04G 7/00; G04G 9/00; G04G 11/00; G04G 13/025; G04G 15/00; A47G 1/0616; A47G 1/14; A47G 1/06; A47G 1/16; F16M 11/105; F16M 11/18; F16M 11/2021; G04B 19/226; G04B 19/26; G04B 23/10; G04B 47/02; G04C 21/12; G09G 2340/0492; G09G 2380/16; G06V 20/30; H04N 1/00347; H04N 1/00127; H04N 1/00196; G06F 3/14

See application file for complete search history.

(56) References Cited

U.S. PATENT DOCUMENTS

| D329,609 S | 9/1992 | Wolff |
| 5,907,523 A | 5/1999 | Richins |
| 9,164,490 B1 * | 10/2015 | Fraser ................... G04G 13/02 |
| 2002/0139028 A1 | 10/2002 | Harlow |
| 2003/0128629 A1 | 7/2003 | Stevens |
| 2008/0129646 A1 | 6/2008 | Bhavnani |
| 2008/0301993 A1 * | 12/2008 | Lian ......................... G04G 9/00 40/700 |
| 2008/0303805 A1 | 12/2008 | Chien |
| 2012/0054651 A1 | 3/2012 | Tsai |

FOREIGN PATENT DOCUMENTS

WO          WO9967684          12/1999

* cited by examiner

*Primary Examiner* — Koosha Sharifi-Tafreshi

(57) ABSTRACT

A digital picture frame assembly includes a housing that is mounted in a conspicuous location thereby facilitating the housing to be visible to a user. A communication unit is integrated into the housing and the communication unit downloads images of bars and taverns in various locations across the world from an extrinsic communication network. An electronic clock is integrated into the housing to communicate the time of day to the user. An image display is integrated into the housing to display a respective one of the images of the bars and taverns that is located where it is 5:00 pm. A bar name display is integrated into the housing to visually communicate the name of the bar or tavern that is currently displayed on the image display. A location display is integrated into the housing to visually communicate the name of the bar or tavern that is currently is displayed on the image display.

8 Claims, 6 Drawing Sheets

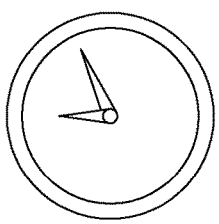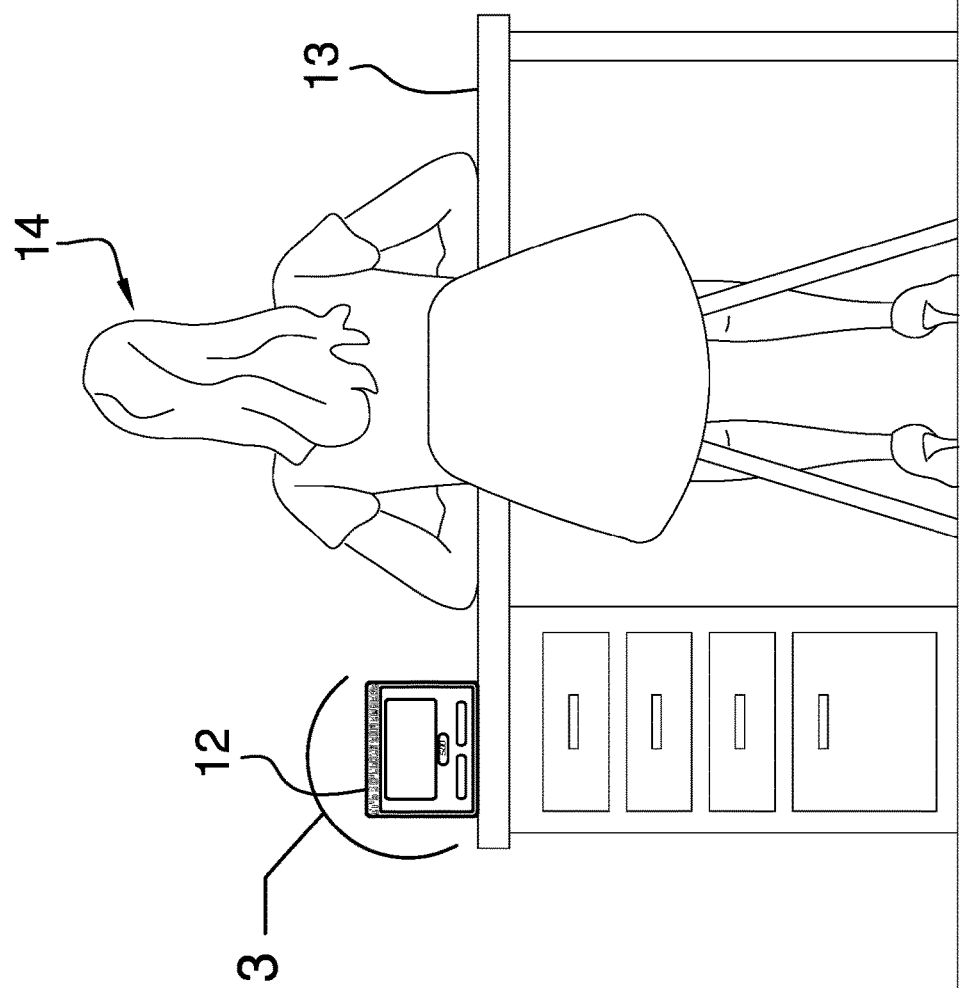
FIG. 2

DIGITAL PICTURE FRAME ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to picture frame devices and more particularly pertains to a new picture frame device for displaying an image of a bar or tavern that is located in a time zone where it is currently 5:00 pm. The device includes a housing into which an image display, a time display, a name display and a location display are each integrated. The device includes a communication unit that downloads images of bars and taverns from locations all over the world. The image display displays an image of a bar or tavern that is located in a time zone that is currently 5:00 pm. The name display displays the name of the bar or tavern being displayed and the location display displays the location of the bar or tavern being displayed.

(2) Description of Related Art Including Information Disclosed Under 37 CFR 1.97 and 1.98

The prior art relates to picture frame devices including a clock that displays the time of day in a variety of time zones. The prior art discloses a chronograph which emits an audible message at the top of each hour comprising the phrase "it's five o'clock somewhere". The prior art discloses a picture frame device that has a clock integrated into a lower corner of the picture frame. The prior art discloses a digital clock which includes a rotating globe and which displays the time of day in any city in the world. The prior art discloses a desktop photo frame that can interchangeably display photos and which includes an AM/FM radio and an electronic display.

BRIEF SUMMARY OF THE INVENTION

An embodiment of the disclosure meets the needs presented above by generally comprising a housing that is mounted in a conspicuous location thereby facilitating the housing to be visible to a user. A communication unit is integrated into the housing and the communication unit downloads images of bars and taverns in various locations across the world from an extrinsic communication network. An electronic clock is integrated into the housing to communicate the time of day to the user. An image display is integrated into the housing to display a respective one of the images of the bars and taverns that is located where it is 5:00 pm. A bar name display is integrated into the housing to visually communicate the name of the bar or tavern that is currently displayed on the image display. A location display is integrated into the housing to visually communicate the name of the bar or tavern that is currently is displayed on the image display.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a perspective in-use view of an embodiment of the disclosure.

DETAILED DESCRIPTION OF THE INVENTION

Figure 1:
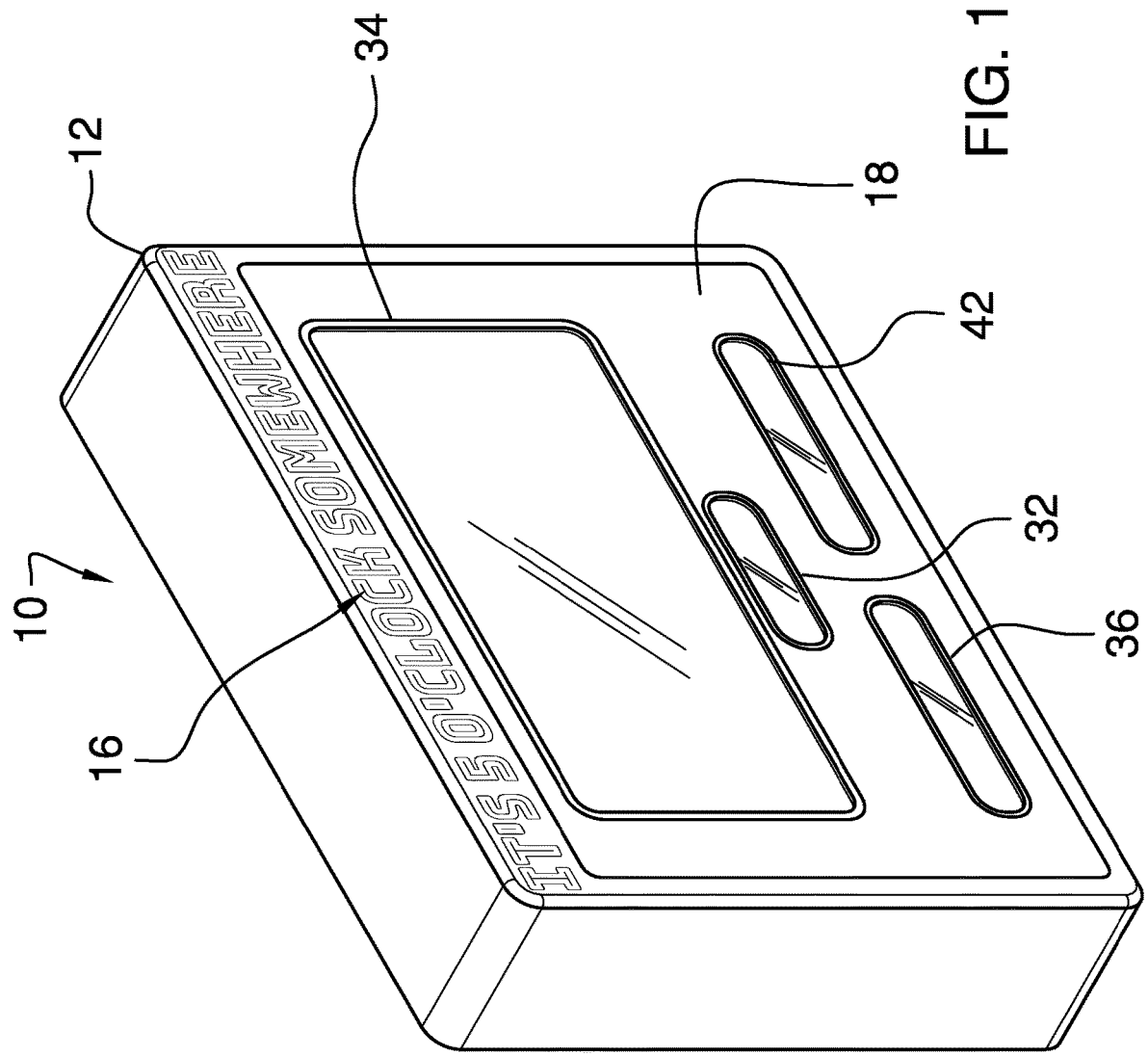
FIG. 1 is a front perspective view of a digital picture frame assembly according to an embodiment of the disclosure.
Figure 3:
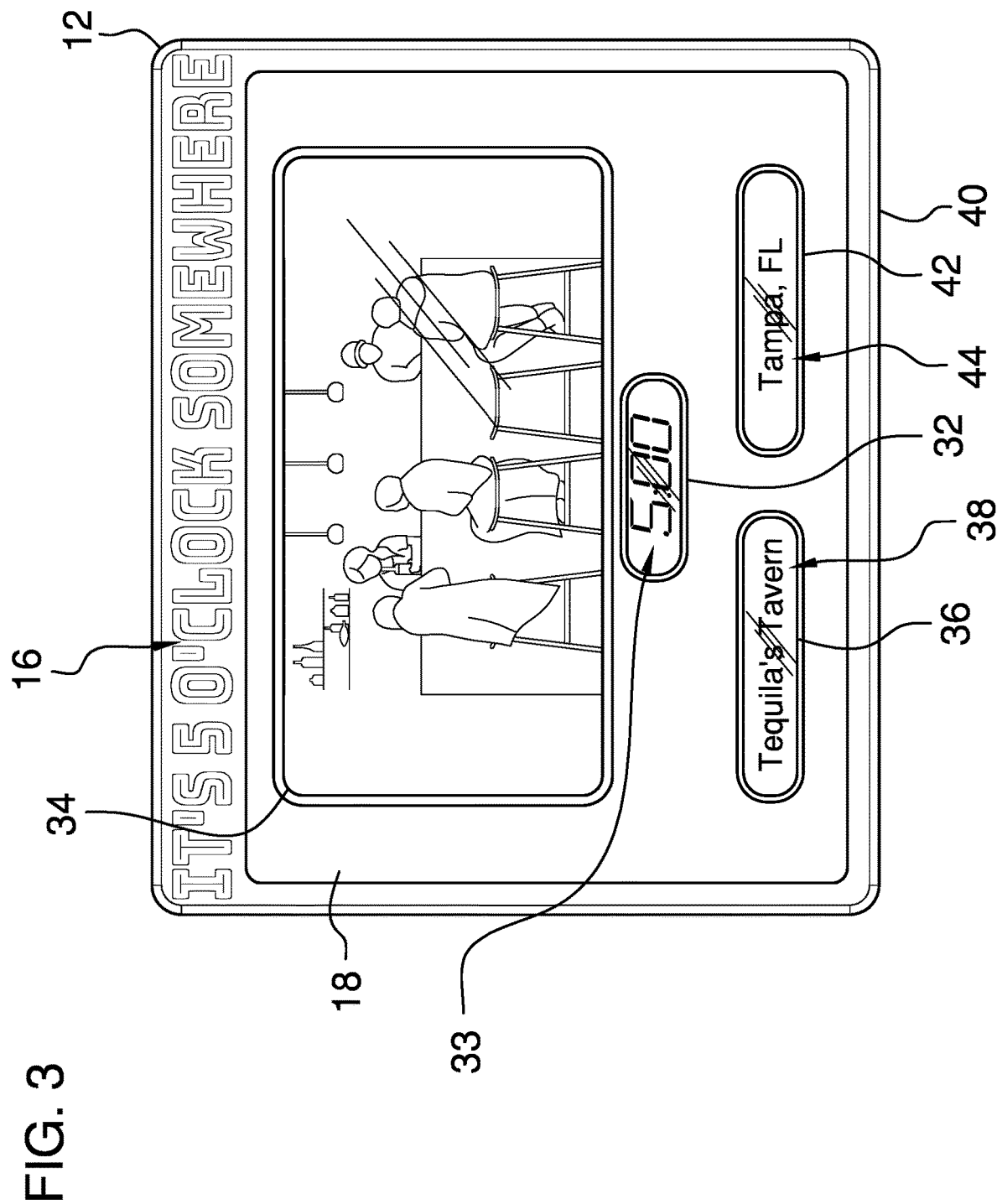
FIG. 3 is a zoomed in view taken from circle 3 of FIG. 2 of an embodiment of the disclosure.
Figure 4:
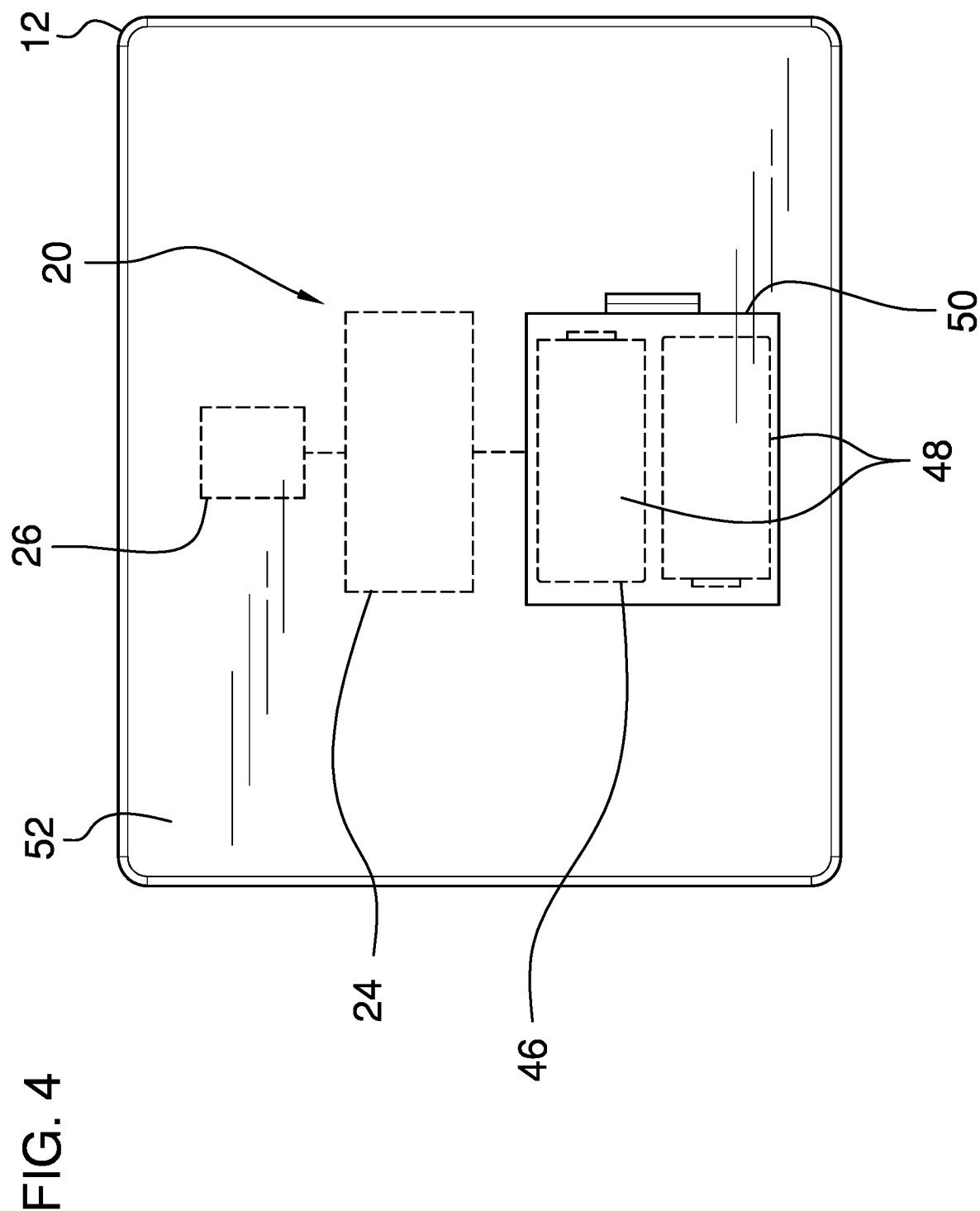
FIG. 4 is a back phantom view of an embodiment of the disclosure.
Figure 5:
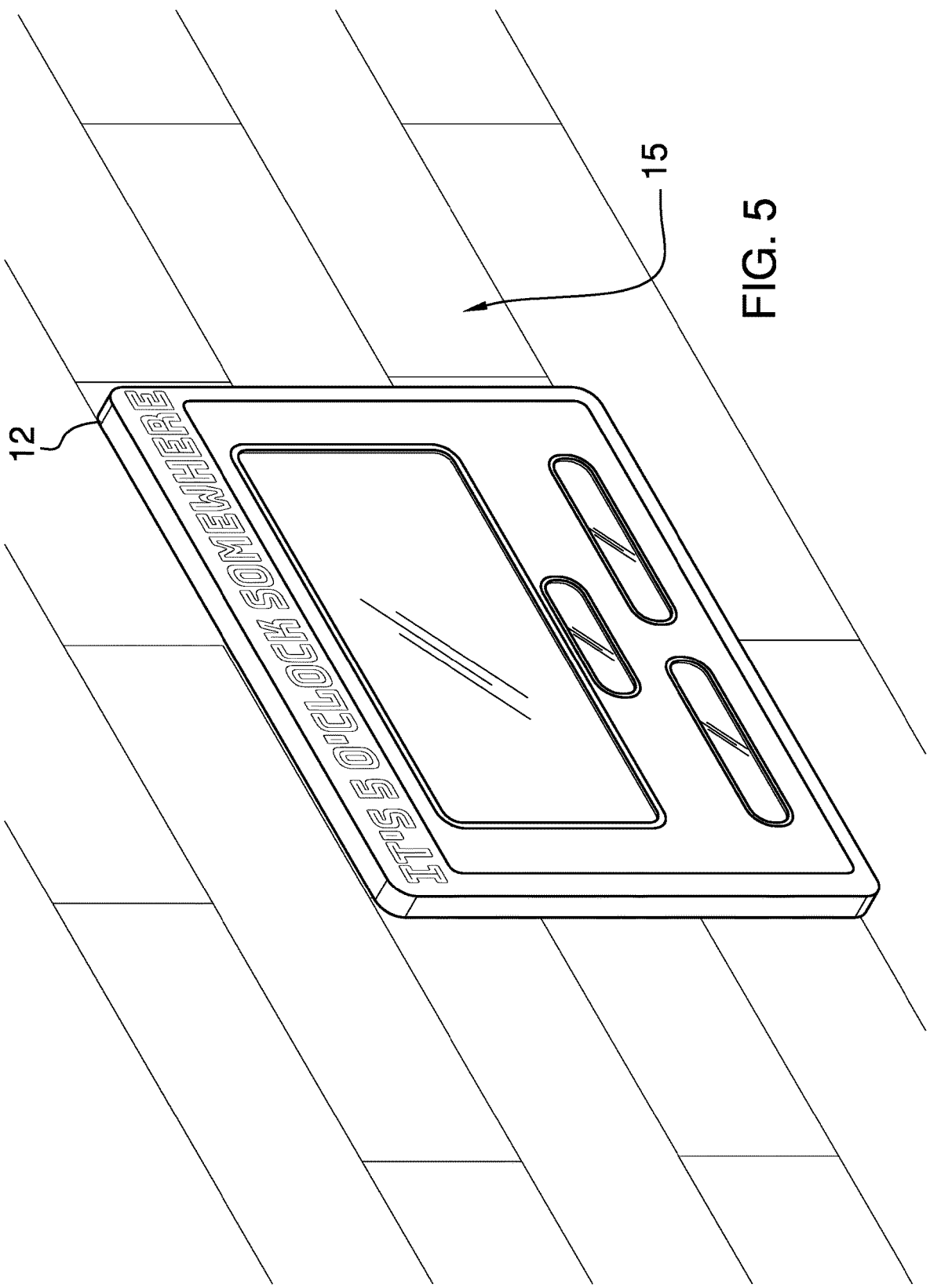
FIG. 5 is a perspective in-use view of an embodiment of the disclosure showing a housing being mounted to wall.
Figure 6:
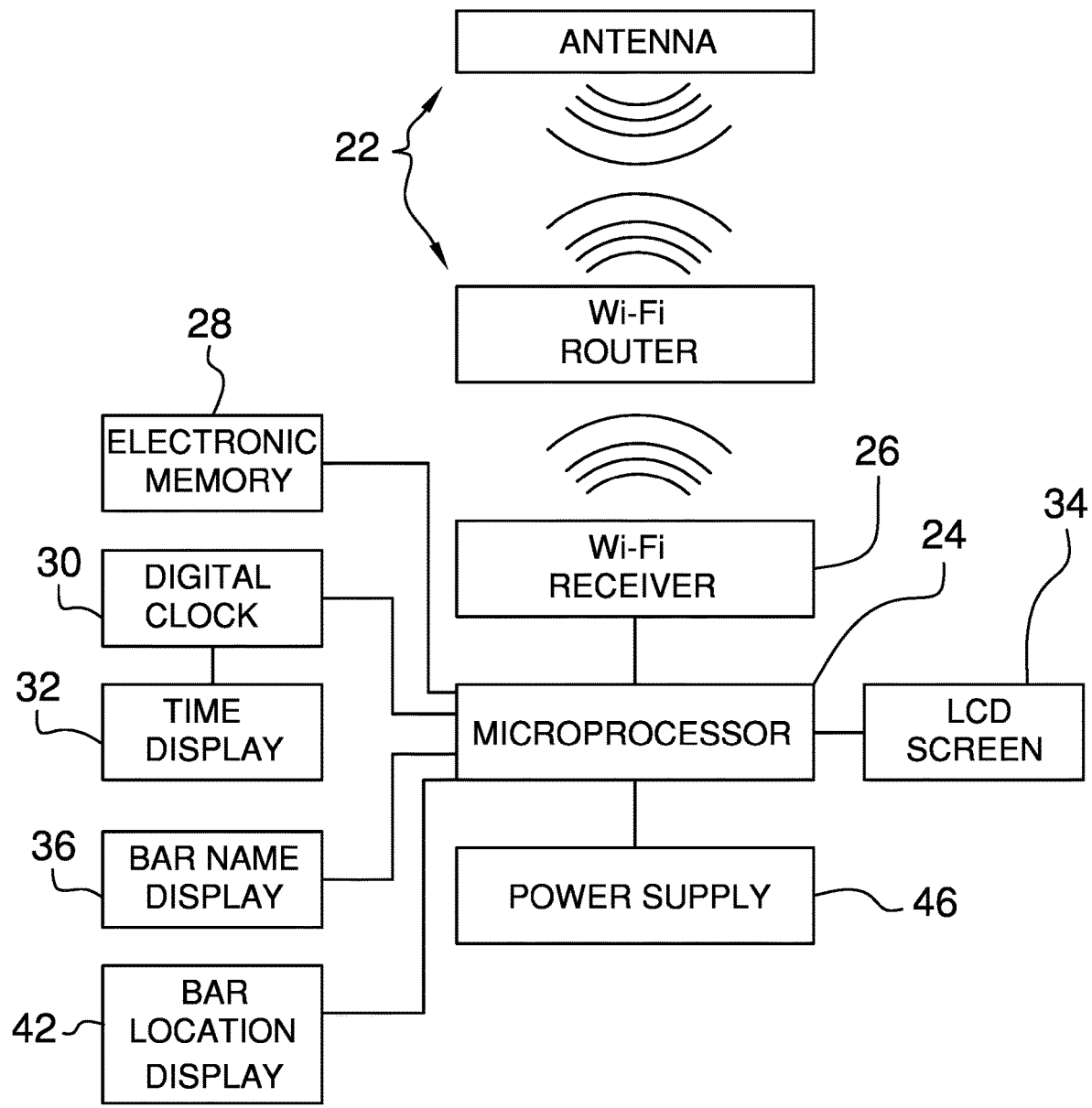
FIG. 6 is a schematic view of an embodiment of the disclosure.

With reference now to the drawings, and in particular to FIGS. 1 through 6 thereof, a new picture frame device embodying the principles and concepts of an embodiment of the disclosure and generally designated by the reference numeral 10 will be described.

As best illustrated in FIGS. 1 through 6, the digital picture frame assembly 10 generally comprises a housing 12 that is mounted in a conspicuous location thereby facilitating the housing 12 to be visible to a user 14. The housing 12 has indicia 16 printed on a front wall 18 of the housing 12 such that the indicia 16 are visible to the user 14. Additionally, the indicia 16 comprise words and letters comprising "It's 5 o'clock somewhere". A communication unit 20 is integrated into the housing 12 and the communication unit 20 is in remote communication with an extrinsic communication network 22 thereby facilitating the communication unit 20 to download images of bars and taverns in various locations across the world from the extrinsic communication network 22. As is most clearly shown in FIG. 2, the housing 12 may be positioned on a desk 13 or other article of furniture. As is most clearly shown in FIG. 5, the housing 12 may be mounted to wall 15 or other vertical support surface.

The communication unit 20 comprises a control circuit 24 that is integrated into the housing 12 and the control circuit 24 receives a display input. A transceiver 26 is integrated into the housing 12 and the transceiver 26 is electrically coupled to the control circuit 24. Additionally, the transceiver 26 is in wireless communication with the extrinsic communication network 22 for downloading the images of bars and taverns. The transceiver 26 downloads the respective time zone of the location in which each of the bars and taverns is located and the transceiver 26 downloads the name of each of the bars and taverns. The transceiver 26 may comprise a radio frequency transceiver or the like and the transceiver 26 may employ a WPAN signal. The extrinsic communication network 22 may comprise a wireless internet router or other type of wireless communication network.

The communication unit 20 includes an electronic memory 28 that is integrated into the housing 12. The electronic memory 28 is electrically coupled to the control circuit 24 for storing the images of the bars and taverns in the electronic memory 28. Additionally, the electronic memory 28 stores a database comprising the respective time zone of the location in which each of the bars and taverns is located. The electronic memory 28 may comprise random access memory or other type of digital data storage.

An electronic clock 30 is integrated into the housing 12 and the electronic clock displays the time of day of the location where the housing 12 is positioned to communicate the time of day to the user 14. The electronic clock 30 is electrically coupled to the control circuit 24 and the electronic clock 30 includes a time display 32 that is integrated into a front wall 18 of the housing 12 such that the time display 32 is visible to the user 14. The time display 32 displays time indicia 33 comprising numbers to visually communicate the time of day. The electronic clock 30 is electrically coupled to the control circuit 24 and the control circuit 24 receives the display input at the top of each hour of the day tracked by the electronic clock 30. The control circuit 24 selects a respective image of the bars and taverns that is located where it is 5:00 pm each instance that the control circuit 24 receives the display input. Additionally, the time display 32 may comprise a liquid crystal display or other type of electronic display.

An image display 34 is integrated into the housing 12 such that the image display 34 is visible to the user 14. The image display 34 displays a respective one of the images of the bars and taverns that is located where it is 5:00 pm to visually communicate to the user 14 where in the world it is currently 5:00 pm. The image display 34 is electrically coupled to the control circuit 24 and the image display 34 displays the image selected by the control circuit 24 each time the control circuit 24 receives the display input. The image display 34 is integrated into the front wall 18 of the housing 12, the image display 34 is positioned beneath the indicia 16 on the front wall 18 of the housing 12 and the time display 32 is positioned beneath the image display 34. Additionally, the image display 34 may comprise a liquid crystal display or other type of electronic display. The images of the bars and taverns might include images of patrons of the bar or tavern that are enjoying an alcoholic beverage.

A bar name display 36 is integrated into the housing 12 such that the bar name display 36 is visible to the user 14. The bar name display 36 displays the name of the bar or tavern that is currently being displayed on the image display 34 to visually communicate the name of the bar or tavern that is currently displayed on the image display 34 to the user 14. The bar name display 36 is electrically coupled to the control circuit 24 and the bar name display 36 displays name indicia 38 comprising letters and words spelling the name of the bar or tavern that is currently displayed on the image display 34. The bar name display 36 receives the name indicia 38 from the electronic memory 28 each time the control circuit 24 receives the display input. The bar name display 36 is positioned between a bottom wall 40 of the housing 12 and the time display 32. Additionally, the bar name display 36 may comprise a liquid crystal display or other type of electronic display.

A location display 42 is integrated into the housing 12 such that the location display 42 is visible to the user 14. The location display 42 displays the location of the bar or tavern that is currently being displayed on the image display 34 to visually communicate the name of the bar or tavern that is currently being displayed on the image display 34 to the user 14. The location display 42 is electrically coupled to the control circuit 24 and the location display 42 displays location indicia 44 comprising letters and words spelling the physical location of the bar or tavern that is currently displayed on the image display 34. The location display 42 receives the location indicia 44 from the electronic memory 28 each time the control circuit 24 receives the display input. Additionally, the location display 42 is positioned between the bottom wall 40 of the housing 12 and the time display 32. The location display 42 may comprise a liquid crystal display or other type of electronic display.

A power supply 46 is integrated into the housing 12, the power supply 46 is electrically coupled to the control circuit 24 and the power supply 46 comprises at least one battery 48. A battery cover 50 is removably integrated into a back wall 52 of the housing 12 and the power supply 46 is positioned beneath the battery cover 50 for replacing the at least one battery 48.

In use, the communication unit 20 downloads the images of the bars and taverns from the extrinsic communication network 22 along with the respective time zone of each of the bars and taverns. The time display 32 continuously displays the time of day of the location in which the housing 12 is positioned. Additionally, the image display 34 displays an image of a bar or tavern that is located in a time zone where it is currently 5:00 pm. The location display 42 displays the physical location of the bar or tavern currently being displayed on the image display 34 and the bar name display 36 displays the name of the bar or tavern currently being displayed on the image display 34. In this way the user 14 can enjoy the image of the bar or tavern and the patrons enjoying what is commonly referred to as "happy hour" in the bar or tavern. Thus, the user 14 can celebrate the fact that it is 5:00 pm somewhere in the world to reduce the stress and discomfort of day to day life.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A digital picture frame assembly for displaying the time of day and pictures of bars and taverns from around the world in a respective time zone where it is 5:00 pm, said assembly comprising:
   a housing being mounted in a conspicuous location thereby facilitating said housing to be visible to a user;
   a communication unit being integrated into said housing, said communication unit being in remote communication with an extrinsic communication network thereby facilitating said communication unit to download images of bars and taverns in various locations across the world from the extrinsic communication network;
   an electronic clock being integrated into said housing, said electronic clock displaying the time of day of the location where said housing is positioned wherein said electronic clock is configured to communicate the time of day to the user;
   an image display being integrated into said housing such that said image display is visible to the user, said image display displaying a respective one of the images of the bars and taverns that is located where it is 5:00 pm wherein said image display is configured to visually communicate to the user where in the world it is currently 5:00 pm;
   a bar name display being integrated into said housing such that said bar name display is visible to the user, said bar name display displaying the name of the bar or tavern that is currently being displayed on said image display wherein said bar name display is configured to visually communicate the name of the bar or tavern that is currently displayed on said image display to the user;
   a location display being integrated into said housing such that said location display is visible to the user, said location display displaying the location of the bar or tavern that is currently being displayed on said image display wherein said location display is configured to visually communicate the name of the bar or tavern that is currently being displayed on said image display to the user.

2. The assembly according to claim 1, wherein:
   said housing has indicia being printed on a front wall of said housing such that said indicia are visible to the user, said indicia comprising words and letters comprising "It's 5 o'clock somewhere";
   said image display is positioned beneath said indicia on said front wall of said housing;
   said time display is positioned beneath said image display; and
   said location display is positioned between said bottom wall of said housing and said time display.

3. The assembly according to claim 1, wherein said communication unit comprises:
   a control circuit being integrated into said housing, said control circuit receiving a display input;
   a transceiver being integrated into said housing, said transceiver being electrically coupled to said control circuit, said transceiver being in wireless communication with the extrinsic communication network for downloading the images of bars and taverns, said transceiver downloading the respective time zone of the location in which each of the bars and taverns is located, said transceiver downloading the name of each of the bars and taverns; and
   an electronic memory being integrated into said housing, said electronic memory being electrically coupled to said control circuit for storing the images of the bars and taverns in said electronic memory, said electronic memory storing a database comprising the respective time zone of the location in which each of the bars and taverns is located.

4. The assembly according to claim 3, wherein:
   said electronic clock is electrically coupled to said control circuit; and
   said electronic clock includes a time display being integrated into a front wall of said housing such that said time display is visible to the user, said time display displaying indicia comprising numbers to visually communicate the time of day, said electronic clock being electrically coupled to said control circuit, said control circuit receiving said display input at the top of each hour of the day tracked by said electronic clock, said control circuit selecting a respective image of the bars and taverns that is located where it is 5:00 pm each instance that said control circuit receives said display input.

5. The assembly according to claim 3, wherein said image display is electrically coupled to said control circuit, said image display displaying said image selected by said control circuit each time said control circuit receives said display input, said time, said image display being integrated into said front wall of said housing.

6. The assembly according to claim 3, wherein said bar name display is electrically coupled to said control circuit, said bar name display displaying name indicia comprising letters and words spelling the name of the bar or tavern that is currently displayed on said image display, said bar name display receiving said name indicia from said electronic memory each time said control circuit receives said display input, said bar name display being positioned between a bottom wall of said housing and said time display.

7. The assembly according to claim 3, wherein said location display is electrically coupled to said control circuit, said location display displaying location indicia comprising letters and words spelling the physical location of the bar or tavern that is currently displayed on said image display, said location display receiving said location indicia from said electronic memory each time said control circuit receives said display input.

8. A digital picture frame assembly for displaying the time of day and pictures of bars and taverns from around the world in a respective time zone where it is 5:00 pm, said assembly comprising:
   a housing being mounted in a conspicuous location thereby facilitating said housing to be visible to a user, said housing having indicia being printed on a front wall of said housing such that said indicia are visible to the user, said indicia comprising words and letters comprising "It's 5 o'clock somewhere";

a communication unit being integrated into said housing, said communication unit being in remote communication with an extrinsic communication network thereby facilitating said communication unit to download images of bars and taverns in various locations across the world from the extrinsic communication network, said communication unit comprising:
  a control circuit being integrated into said housing, said control circuit receiving a display input;
  a transceiver being integrated into said housing, said transceiver being electrically coupled to said control circuit, said transceiver being in wireless communication with the extrinsic communication network for downloading the images of bars and taverns, said transceiver downloading the respective time zone of the location in which each of the bars and taverns is located, said transceiver downloading the name of each of the bars and taverns; and
  an electronic memory being integrated into said housing, said electronic memory being electrically coupled to said control circuit for storing the images of the bars and taverns in said electronic memory, said electronic memory storing a database comprising the respective time zone of the location in which each of the bars and taverns is located;
an electronic clock being integrated into said housing, said electronic clock displaying the time of day of the location where said housing is positioned wherein said electronic clock is configured to communicate the time of day to the user, said electronic clock being electrically coupled to said control circuit, said electronic clock including a time display being integrated into a front wall of said housing such that said time display is visible to the user, said time display displaying indicia comprising numbers to visually communicate the time of day, said electronic clock being electrically coupled to said control circuit, said control circuit receiving said display input at the top of each hour of the day tracked by said electronic clock, said control circuit selecting a respective image of the bars and taverns that is located where it is 5:00 pm each instance that said control circuit receives said display input;
an image display being integrated into said housing such that said image display is visible to the user, said image display displaying a respective one of the images of the bars and taverns that is located where it is 5:00 pm wherein said image display is configured to visually communicate to the user where in the world it is currently 5:00 pm, said image display being electrically coupled to said control circuit, said image display displaying said image selected by said control circuit each time said control circuit receives said display input, said image display being integrated into said front wall of said housing, said image display being positioned beneath said indicia on said front wall of said housing, said time display being positioned beneath said image display;
a bar name display being integrated into said housing such that said bar name display is visible to the user, said bar name display displaying the name of the bar or tavern that is currently being displayed on said image display wherein said bar name display is configured to visually communicate the name of the bar or tavern that is currently displayed on said image display to the user, said bar name display being electrically coupled to said control circuit, said bar name display displaying name indicia comprising letters and words spelling the name of the bar or tavern that is currently displayed on said image display, said bar name display receiving said name indicia from said electronic memory each time said control circuit receives said display input, said bar name display being positioned between a bottom wall of said housing and said time display;
a location display being integrated into said housing such that said location display is visible to the user, said location display displaying the location of the bar or tavern that is currently being displayed on said image display wherein said location display is configured to visually communicate the name of the bar or tavern that is currently being displayed on said image display to the user, said location display being electrically coupled to said control circuit, said location display displaying location indicia comprising letters and words spelling the physical location of the bar or tavern that is currently displayed on said image display, said location display receiving said location indicia from said electronic memory each time said control circuit receives said display input, said location display being positioned between said bottom wall of said housing and said time display; and
a power supply being integrated into said housing, said power supply being electrically coupled to said control circuit, said power supply comprising at least one battery.

* * * * *